(12) United States Patent
Alnaqash et al.

(10) Patent No.: US 8,690,423 B2
(45) Date of Patent: Apr. 8, 2014

(54) TEMPERATURE SENSOR

(75) Inventors: Zaid Alnaqash, Farmington Hills, MI (US); Ken Kubasek, Mansfield, OH (US); Ronald N. Landis, Bellville, OH (US)

(73) Assignee: Stoneridge, Inc., Warren, OH (US)

(\*) Notice: Subject to any disclaimer, the term of this patent is extended or adjusted under 35 U.S.C. 154(b) by 0 days.

(21) Appl. No.: 13/227,424

(22) Filed: Sep. 7, 2011

(65) Prior Publication Data

US 2012/0082181 A1  Apr. 5, 2012

Related U.S. Application Data

(60) Provisional application No. 61/380,504, filed on Sep. 7, 2010.

(51) Int. Cl.
*G01K 7/00* (2006.01)

(52) U.S. Cl.
USPC ........................................ 374/144; 374/185

(58) Field of Classification Search
USPC ......... 374/144, 702, 130, 209, 571, 208, 163, 374/185, 183
See application file for complete search history.

(56) References Cited

U.S. PATENT DOCUMENTS

| | | | |
|---|---|---|---|
| 3,621,204 A | 11/1971 | Neidhardt | |
| 3,813,771 A | 6/1974 | Skogland | |
| 4,101,760 A | 7/1978 | Roller | |
| 4,280,932 A | 7/1981 | Borom et al. | |
| 4,639,712 A | 1/1987 | Kobayashi et al. | |
| 5,209,571 A | 5/1993 | Kendall | |
| 5,889,460 A | 3/1999 | Bachmann et al. | |
| 6,069,910 A | 5/2000 | Eckert | |
| 6,121,577 A | 9/2000 | Jakobi et al. | |
| 6,305,841 B1 | 10/2001 | Fukaya et al. | |
| 7,682,076 B2* | 3/2010 | Landis et al. | 374/185 |
| 7,748,898 B2 | 7/2010 | Toudou et al. | |
| 7,935,235 B2* | 5/2011 | Matsuo et al. | 204/428 |
| 2003/0217767 A1 | 11/2003 | Kushihashi et al. | |
| 2004/0075527 A1 | 4/2004 | Zitzmann et al. | |
| 2004/0218662 A1 | 11/2004 | Hanzawa et al. | |
| 2005/0129089 A1 | 6/2005 | Glozman et al. | |

(Continued)

FOREIGN PATENT DOCUMENTS

JP  54150751  11/1979

OTHER PUBLICATIONS

International Search Report and Written Opinion dated Jan. 11, 2012 issued in related International Patent Application No. PCT/US11/50729.

*Primary Examiner* — Lisa Caputo
*Assistant Examiner* — Brandi N Hopkins
(74) *Attorney, Agent, or Firm* — Grossman, Tucker, Perreault & Pfleger, PLLC.

(57) ABSTRACT

A sensor configured to detect exhaust gas temperature of an exhaust, the sensor including a housing and a sensing element at least partially disposed within the housing. A filler material, including a first media and at least one additional media, is disposed within the housing and at least partially surrounds the sensing element. The first media is configured to be stable in reducing atmospheres up to 800° C. and in oxidizing atmospheres up to 850° C. and the second media is configured to provide oxygen storage capacity and enhance chemical stability and/or oxygen entrapment.

20 Claims, 2 Drawing Sheets

(56) References Cited

U.S. PATENT DOCUMENTS

| | | |
|---|---|---|
| 2007/0024414 A1 | 2/2007 | Beckmeyer et al. |
| 2007/0171959 A1 | 7/2007 | Irrgang et al. |
| 2007/0297486 A1 | 12/2007 | Landis et al. |
| 2008/0080592 A1 | 4/2008 | Houben et al. |
| 2008/0205484 A1 | 8/2008 | Toudou et al. |
| 2010/0118911 A1 | 5/2010 | Lorrette et al. |

* cited by examiner

TEMPERATURE SENSOR

CROSS-REFERENCE TO RELATED APPLICATIONS

The present application claims the benefit of U.S. Provisional Patent Application Ser. No. 61/380,504, filed Sep. 7, 2010, the entire disclosure of which is incorporated herein by reference.

FIELD

The present disclosure relates generally to sensors for internal combustion engines, and, more particularly, to an exhaust gas temperature sensor.

BACKGROUND

Internal combustion engines such as, but not limited to, diesel and gasoline engines, may include one or more temperature sensors at least partially disposed within the exhaust gas system. These temperature sensors may sense the temperature of the exhaust gas and may be used, at least in part, by an engine control system to adjust one or more properties of the engine such as, but not limited to, air/fuel ratio, boost pressure, exhaust regeneration cycles/duration, timing or the like. Because of the operating environment, the temperature sensors may be exposed to relatively harsh conditions including, but not limited to, vibration, exposure to debris, moisture and corrosive chemicals, large temperature ranges and rates of temperature change and relatively high continuous use operating temperatures. The conditions may degrade the performance of the temperature sensors and may, ultimately, render the temperature sensors unsuitable for their intended purpose.

Thin film resistive temperature detectors are a variety of temperature sensor used for detecting temperature in many applications, including but not limited to effluent or emissions from an engine. For example, such detectors may be used for detecting the exhaust gas temperature of an internal combustion engine. The exhaust gas temperature sensor may be part of an engine management system. Various operating parameters, such as fuel delivery, etc., may be adjusted based in part on a measured exhaust gas temperature.

Platinum metal film resistive temperature detectors are one particular variety of temperature sensor used for detecting effluent temperature. The platinum metal resistive element used in such temperature detectors is sensitive to environmental conditions. For example, a reducing atmosphere may cause migration of the platinum film of the resistive element from its substrate if oxygen in the surrounding atmosphere is below a threshold concentration. Significant loss of platinum from the resistive temperature detector resulting from decomposition or migration of the platinum may adversely affect the performance and life of the temperature detector.

Oxide/ceramic based resistive temperature sensing elements commonly referred to as negative temperature coefficient (NTC) elements and/or positive temperature coefficient (PTC) elements are also a particular variety of elements incorporated into a temperature sensor used for detecting effluent temperature. A NTC element generally refers to materials that experience a decrease in electrical resistance with increasing temperature, typically in a defined temperature range. A PTC element generally refers to materials that experience an increase in electrical resistance with increasing temperature. The higher the coefficient, the greater an increase in electrical resistance for a given temperature increase. Similar to platinum metal resistive elements, NTC/PTC elements used in such temperature sensors are also sensitive to environmental conditions, such as those discussed above, which may adversely affect the performance and life of the temperature detector.

The interior surfaces of a closed, or encapsulated, temperature sensor may react with the trapped oxygen in the closed environment, thereby reducing the oxygen concentration and leaving the platinum resistive element susceptible to damage from the resulting reducing environment. The volume of air which may be contained within the closed temperature sensor may be limited because too great an internal volume may insulate the resistive temperature detector element from the exterior of the sensor, greatly increasing the thermal time constant and reducing the performance of the sensor. Because of the restrictions on the internal volume of the enclosure, even if the interior surfaces of the enclosure have been pre-oxidized prior to final assembly of the sensor, further oxidation of the interior surfaces and/or contaminates which may occur over time may still reduce the oxygen concentration leaving the resistive element, such as platinum and/or PTC/NTC elements, susceptible to damage.

Open temperature probes, which do not provide a closed environment, are open to the outside atmosphere to allow oxygen exchange with the platinum film of the temperature detector in order to prevent the loss or migration of the metal film in the presence of a reducing atmosphere. While the open design may allow communication with the external atmosphere, the external atmosphere may not, necessarily, provide a sufficient oxygen concentration to prevent the loss of, or damage to, the thin film resistive element. Additionally, the open design may allow the entrance of contaminants, inhibit or otherwise negatively affect the substrate, the platinum film, the thermal response time, etc., of the temperature detector. Open probes may also be subject to the introduction of moisture, which, when combined with freezing temperatures and less than optimal mounting orientations and/or positions, can result in structural damage as the result of freeze/thaw forces applied thereto.

BRIEF DESCRIPTION OF THE DRAWINGS

Features and advantages of the present disclosure are set forth by the description of embodiments consistent therewith, which description should be considered in conjunction with the accompanying drawings, wherein.

DETAILED DESCRIPTION

The subject matter of the present disclosure may involve, in some cases, interrelated products, alternative solutions to a particular problem, and/or a plurality of different uses of a single system or article.

The present disclosure is generally directed at temperature sensors. Embodiments described herein may relate to an exhaust gas temperature sensor system, for example, an exhaust gas temperature sensor system configured to be used with an internal combustion engine such as, but not limited to, a diesel engine, a gasoline engine, or the like. The output of the exhaust gas temperature sensor system may be received by a controller to control one or more parameters of the engine. However, a sensor and/or system consistent with the present disclosure may be used to detect, sense and/or monitor the temperature of other parameters including, but not limited to, catalytic converter temperature, lubricant temperature (such as, but not limited to, engine oil, transmission oil, differential oil, or the like), brake temperature, engine coolant temperature, or the like. A sensor and/or system consistent with the present disclosure may be employed in connection with various other applications, both related to, and unrelated to, vehicles.

Figure 1:
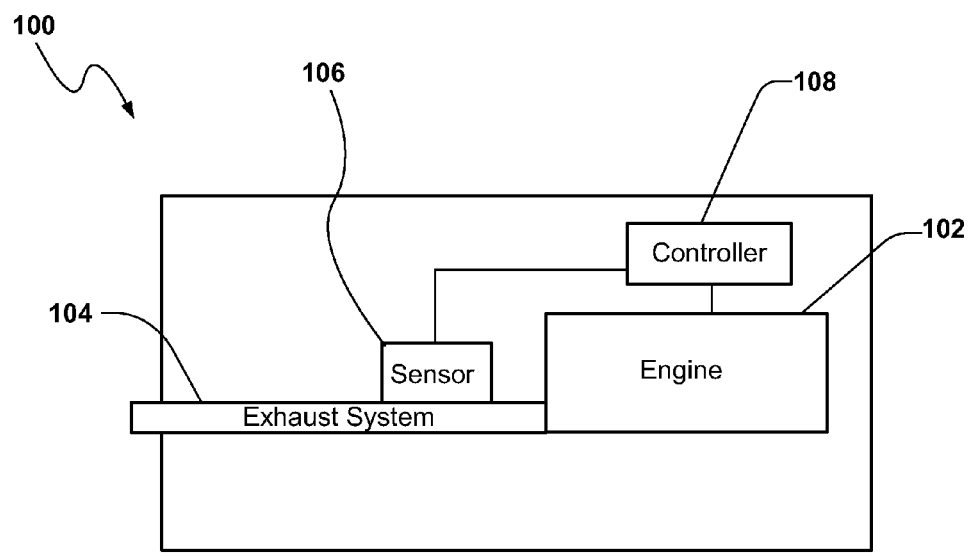
FIG. 1 is a schematic illustration of a vehicle including a temperature sensor consistent with the present disclosure.

Referring to FIG. 1 an embodiment of a vehicle 100 is schematically depicted. The vehicle 100 may include an internal combustion engine 102 having an exhaust system 104 which may carry a flow of exhaust gasses from the engine 102. A temperature sensor 106 may be coupled to the exhaust system 104 for measuring a temperature of the exhaust gasses carried by the exhaust system 104. The temperature sensor 106 may provide an output responsive to, or indicative of, a temperature of the exhaust gasses. A vehicle control system 108, such as an engine control module (ECM), etc., may receive the output from the temperature sensor 106. The engine control system 108 may vary one or more operating parameters, such as fuel delivery, air/fuel ratio, boost pressure, timing or the like in response to the output of the temperature sensor(s) 106.

Figure 2:
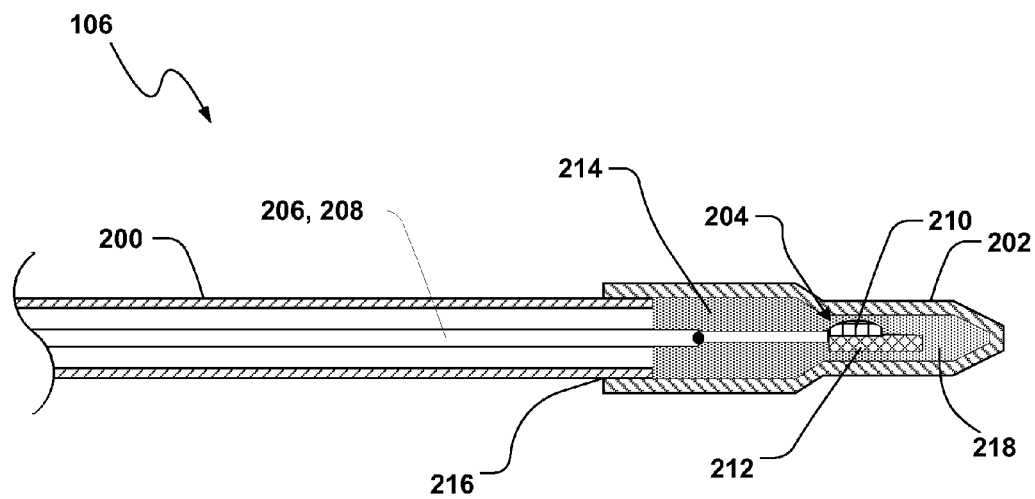
FIG. 2 is a side cross-sectional view of an embodiment of a temperature sensor consistent with the present disclosure.
Figure 3:
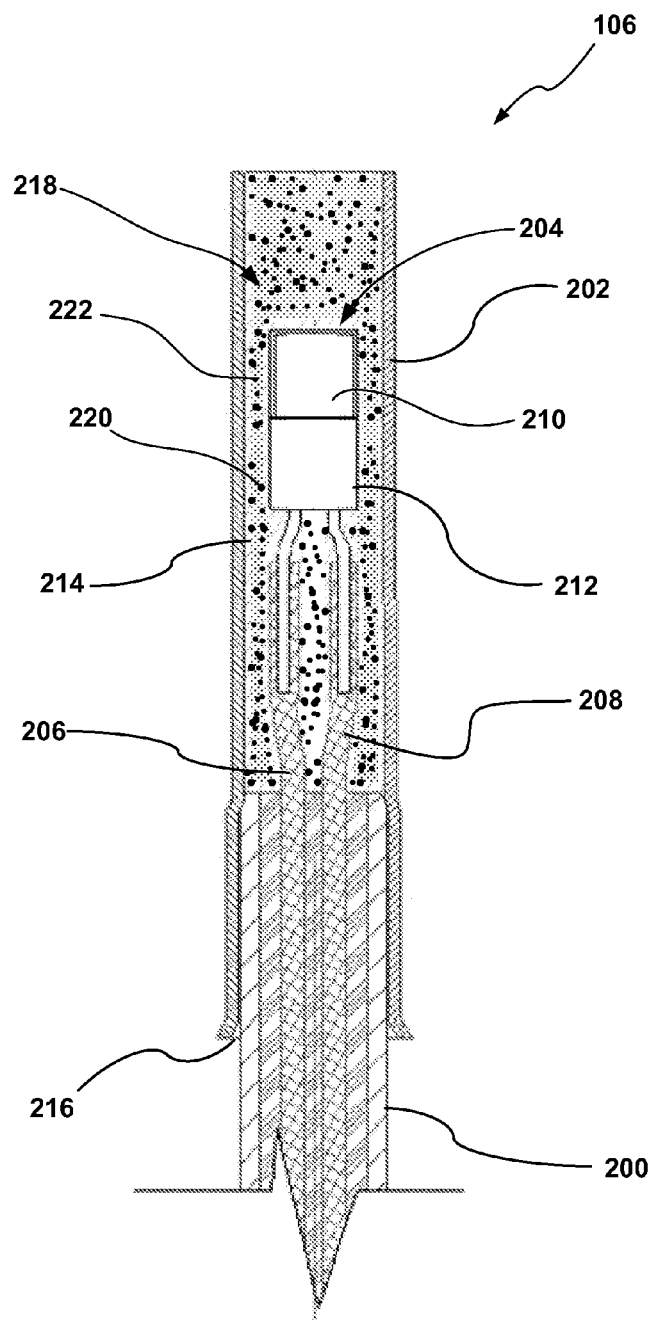
FIG. 3 is a front cross-sectional view of the temperature sensor of FIG. 2.

Turning to FIGS. 2-3, a portion of an embodiment of a temperature sensor 106 consistent with the present invention is shown in side and front cross-sectional views. The temperature sensor 106 may generally include a longitudinal body 200 having a housing 202 disposed at one end of the body 200. A temperature sensing element 204 may be disposed at least partially within the housing 202. Electrical connections 206, 208 for the temperature sensor 106 may extend from the temperature sensing element 204 and through the body 200. It should be noted that in other embodiments, the temperature sensor 106 may include additional connections to compensate for any additional features and/or materials. For example, in other embodiments, the distance from the temperature sensing element 204 to the body 200 may be increased, which may result in additional features and/or materials, as well as connections, to be included. The temperature sensor system may include various mounting features, such as a flange and mounting nut, a compression ferrule, etc., capable of mounting the temperature sensor extending at least partially into an exhaust system while maintaining a generally sealed condition of the exhaust system. Similarly, the temperature sensor system may include electrical connectors or contacts electrically coupled to the electrical connections for the temperature sensor. Suitable connectors may include integral features as well as pigtail connectors, etc.

The temperature sensing element 204 may be a resistive temperature sensing element, in which the electrical resistance through the element may vary as a function of temperature. In a particular embodiment, the temperature sensing element 204 may be a thin film resistive temperature detector including at least one metal film 210, e.g. a platinum film, film disposed on a substrate 212. In other embodiments, various temperature sensing elements may be included, such as, for example, resistance temperature detector (RTD), negative temperature coefficient (NTC), positive temperature coefficient (PTC), and/or thermocouple type elements.

As shown, the housing 202 may define an interior volume 214. The temperature sensing element 204 may be at least partially disposed within the interior volume 214 defined by the housing 202. As such, the temperature sensing element 204 may be at least partially encapsulated by the housing 202.

The housing 202 may be coupled to the body 200 of the temperature sensor 106 at an open end 216 of the housing 202. In one embodiment, the housing 202 may be coupled to the body 200 to provide a generally gas tight seal, thereby placing the temperature sensing element 204 in a generally closed environment. The generally closed environment may reduce or eliminate exposure of the temperature sensing element 204 to contaminants, etc., of the exterior environment.

The closed atmosphere provided by the housing 202 may prevent or reduce exposure of the temperature sensing element 204 to contaminants. Correspondingly, the generally closed environment provided by the housing 202 may at least partially maintain or control the environment immediately around the temperature sensing element 204. In the context of a platinum metal film resistive temperature detector, or similarly susceptible element, the interior volume 214 provided by the housing 202 may allow a sufficient quantity of oxygen to be present in the interior atmosphere of the temperature sensor 106 to reduce the degradation, or the rate of degradation, of the temperature sensing element 204.

Consistent with the present disclosure, filler material 218 may be disposed within the interior volume 214 of the housing 202, and may at least partially surround the temperature sensing element 204. The filler material 218 may be a particulate. In one embodiment, the filler material 218 may fill the entire space between the sensing element 204 and the interior surface of the housing 202. The filler material 218 may be provided through the open end 216 of the housing 202 in a powder and/or liquid form and then cured in the housing 202, e.g. thermally. Generally, the filler material 218 may provide thermal conductivity while being flexible to accommodate for thermally induced stresses in or between the sensor elements, e.g. between the sensing element 204 and leads connected thereto, during operation. The filler material 218 at least partially surrounding the temperature sensing element 204 may limit movement of the temperature sensing element 204. The support of the temperature sensing element 204 by the filler material 218 may limit mechanical loading and physical stresses placed on the temperature sensing element 204, e.g., due to vibration, shocks, etc. The temperature sensing element 204 may, therefore, be physically protected, to some degree, by the filler material 218.

The filler material 218 may be produced from material(s) which exhibit(s) a relatively low reactivity with oxygen. A low reactivity with oxygen may not tend to consume the oxygen contained within the housing 202, leaving the oxygen to prevent or reduce the degradation of the temperature sensing element 204. Additionally, the filler material 218 may include material configured to improve thermal conductivity while maintaining the temperature sensing element stability at high temperatures.

The filler material 218 may be a highly refractory (heat-resistant, stable) material.

The filler material 218 may have a greater thermal conductivity than air or a gaseous medium. The filler material 218 may thus, at least to some extent, overcome any insulating effect of the separation between the housing 202 and the temperature sensing element 204. The filler material 218 may provide a thermal pathway between the housing 202 and the temperature sensing element 204, and may, thereby, increase the thermal response of the temperature sensor 106.

In addition, use of filler material 218 may eliminate the need for a separate mechanical strain relief to accommodate for thermally induced stresses on the sensor element 204. Instead of the separate strain relief, the filler material 218 may be resiliently flexible/expandable to allow the sensor components, e.g. the sensing element 204 and the leads coupled thereto, to expand at different rates, e.g. due different coefficients of thermal expansion. This may alleviate thermally induced stresses in the sensor 106, without requiring a separate mechanical strain relief.

It should be noted that filler material 218 may include one or more materials. For example, the filler material 218, for example, may include a blend of first particles, i.e. first media 320, and second particles, i.e. second media 322, wherein the first and second particles are different materials. For example, as shown in FIG. 3, the filler material 218 of the sensor 106 may include a first media 320 and at least one additional media 322 (hereinafter referred to as "second media 322" for ease of description) disposed in the housing 202 and at least partially around the sensing element 204.

Preferably, a filler material 218 included in a temperature sensor 106 consistent with the present disclosure includes boron nitride as a first media 320. Boron nitride is particularly useful and an appropriate media for high temperature automotive applications, such as, but not limited to, exhaust, EGR, and/or turbocharger, due to a plurality of beneficial properties, including, but not limited to, a high temperature stability, low coefficient of friction, extreme pressure performance, high thermal conductivity, high electrical resistivity, and inertness in a wide variety of chemical environments. Additionally, boron nitride may be soft and lubricious, providing a favorable environment for the sensing element 204 due to a low coefficient of friction. Boron nitride may also have the ability to retain lubricity at high temperatures. Boron nitride may be configured to be stable and/or inert in reducing atmospheres up to 800° C. and/or in oxidizing atmospheres to 850° C. As used herein, a material is considered stable when the material is not particularly reactive and the material's properties do not change significantly in a particular environment and/or during use. A reducing atmosphere as used herein occurs when oxygen in the housing is below threshold concentration thereby resulting in migration a portion of sensing element structure, e.g. a metal film, from an associated substrate.

Consistent with all of the foregoing aspects, boron nitride is particularly useful and an appropriate media for high temperature automotive applications, such as exhaust, EGR, and turbocharger.

In one embodiment, the first media 320, e.g. boron nitride, may be in the form of a powder and may be amorphous in structure. In another embodiment, the first media 320 may include hexagonal boron nitride, having a hexagonal crystalline structure, wherein the crystalline structure may be configured to provide enhanced thermal conduction capabilities and/or a reduction in chemical reactivity.

The first media 320, e.g. boron nitride, may be selected from a range of grades, the grades of powder having a variety of particle sizes. The range of particle sizes may provide the necessary oxygen to the sensing element 204. The range of particle sizes of the boron nitride or hexagonal boron nitride powder may also result in various surface areas providing different amounts of exposure to the environment. Differing amounts of exposure to the environment may lead to different oxygen percentages, leading to different levels of oxidization.

The second media 322 may be a material configured to cooperate with the first media 320, e.g. boron nitride, to enhance the chemical properties of at least the boron nitride and thereby improve stability of the temperature sensing element 204 and increase durability and extend the life of the temperature sensing element 204. In particular, the second media may provide oxygen storage capacity and enhance chemical stability and/or oxygen entrapment of the filler material 218.

Preferably, a second media 322 includes a composite oxide material including a cerium oxide and a yttria stabilized zirconia (zirconium-oxide based ceramic). A composite oxide including cerium and yttria stabilized zirconia (hereinafter referred to as "composite 322") is particularly useful in that the chemical structure of such a composite 322 may allow oxygen binding at low temperatures and liberation of bound oxygen at high temperatures. In particular, physical anomalies of a lattice structure of particles of the composite 322 allow such a composite 322 to entrain and capture oxygen. The volume of oxygen entrained may be present as pure oxygen gas. The oxygen entrained in the composite 322 may allow the loss of a quantity of oxygen, e.g., to oxidation of the housing, etc., while still maintaining sufficient quantity of oxygen within the interior volume of the housing 202 to prevent or delay degradation of the temperature sensing element (or any element which is negatively impacted by a reducing atmosphere or conditions as previously described) in a reducing atmosphere.

After which, the entrained oxygen may be liberated at higher temperatures due to expansion of the lattice structure, allowing further vacancies for oxygen, thereby lowering the electric motive force/attraction of the oxygen within the lattice structure and allowing the composite 322 to behave as an oxygen donor at higher temperatures due to the decreases in residual charge and attraction for oxygen. Rather than entraining oxygen by providing an interstitial volume, i.e., a volume between discrete particles of the first and/or second medias 320, 322, the lattice structure of the particles of the composite 322 allows the entrainment and/or release of oxygen.

In one embodiment, the filler material 218 may include a mixture of particle sizes to control oxygen content and thermal response of the temperature sensor 106. Smaller particles may at least partially lie in the interstices of the larger particles, thereby increasing the efficacy of the thermal pathway while still providing open interstitial volume for the entrainment of oxygen. The particular particle grain size(s) used in an embodiment may depend on the size and configuration of the sensor 106, housing 202, and sensing element 204.

A temperature sensor 106 consistent with the present disclosure may be manufactured to enhance various characteristics, such as the ability to maintain an oxygen concentration above a threshold concentration to prevent or reduce degradation. For example, the interior surfaces of the housing 202 may be passivated to reduce the reactivity of the housing 202. The reduced reactivity of the housing 202 may reduce oxygen loss due to oxidation of the housing 202. In one such embodiment, the interior surfaces of the housing 202 may be pre-oxidized. Pre-oxidization may be achieve by any known method including, for example, exposure to oxygen, treatment with a chemical oxidizing agent, etc. Pre-oxidation may prevent moisture contamination and further oxidation once the housing with the sensor element therein is closed to the outside atmosphere.

In another aspect, the housing 202 of the temperature sensor 106 may be vibration filled to allow settling of the filler material 218. For example, with the temperature sensing element 204 at least partially inserted in the housing 202, the housing 202 may be vibrated as the filler material 218, such as hexagonal boron nitride powder, is introduced into the housing 202. In another embodiment, the housing 202 may be at least partially filled with the filler material 218. The housing 202 with the filler material 218 may be vibrated as the temperature sensing element 204 is at least partially inserted into the housing 202. Vibration of the housing 202 and the filler material 218 may at least partially fluidize the filler material 218, facilitating insertion of the temperature sensing element 204 and settling of the filler material 218 around the temperature sensing element 204. The use of vibration filling techniques may allow proper settling of the filler material 218 and may increase the physical protection of the temperature sensing element 204 as well as thermal conductivity provided by the filler material 218. Of course, other operations may be used for providing the filler material 218 disposed at least partially around the temperature sensing element 204 in the housing 202.

According to one aspect of the disclosure there is provided a temperature sensor including a body, a housing coupled to one end of the body, and a temperature sensing element disposed within the housing, wherein electrical connections extend from the sensing element through the housing and the body. A filler material is disposed in the housing and at least partially around the temperature sensing element. The filler material includes a blend of a first media and a second media. The first media includes boron nitride and the second media is configured to bind with oxygen in the housing at low temperatures and to release oxygen in the housing at high temperatures that are higher than the low temperatures.

According to another aspect of the disclosure there is provided a temperature sensor including a body, a housing coupled to one end of the body, and a temperature sensing element disposed within the housing, wherein electrical connections extend from the sensing element through the housing and the body. A filler material is disposed in the housing and at least partially around the temperature sensing element. The filler material includes a blend of a first media and a second media. The first media includes hexagonal boron nitride and the second media is configured to bind with oxygen in the housing at low temperatures and to release oxygen in the housing at high temperatures that are higher than the low temperatures. The second media is further configured to cooperate with and enhance chemical properties of the hexagonal boron nitride and to improve stability and durability of the temperature sensing element.

According to yet another aspect of the disclosure there is provided a system including an engine, an exhaust system configured to carry exhaust gases from the engine, and a sensor coupled to the exhaust system for detecting a temperature of the exhaust gases. The sensor includes a body, a housing coupled to one end of the body, and a temperature sensing element disposed within the housing, wherein electrical connections extend from the sensing element through the housing and the body. A filler material is disposed in the housing and at least partially around the temperature sensing element. The filler material includes a blend of a first media and a second media. The filler material includes a blend of a first media and a second media. The first media includes boron nitride and the second media is configured to bind with oxygen in the housing at low temperatures and to release oxygen in the housing at high temperatures that are higher than the low temperatures. The system further includes a vehicle control system configured to control at least one operating parameter of the engine in response to an output of the sensor.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. A temperature sensor comprising:
   a body;
   a housing coupled to one end of said body;
   a temperature sensing element disposed within said housing, said temperature sensing element comprising a resistive temperature detection element disposed on a portion thereof;
   electrical connections extending from said sensing element through said housing and said body; and
   a filler material disposed in said housing in contact with and surrounding said resistive temperature detection element of said temperature sensing element, said filler material consisting essentially of a first media comprising boron nitride and being configured to provide a thermal pathway between said housing and said resistive temperature detection element of said temperature sensing element and being flexible to accommodate different rates of thermal expansion between said temperature sensing element and at least said electrical connections.

2. The temperature sensor of claim 1 wherein said boron nitride is configured to be stable in reducing atmospheres up to 800° C. and in oxidizing atmospheres up to 850° C.

3. The temperature sensor of claim 1 wherein said boron nitride has a hexagonal crystalline structure.

4. A temperature sensor comprising:
   a body;
   a housing coupled to one end of said body;
   a temperature sensing element disposed within said housing, said temperature sensing element comprising a resistive temperature detection element disposed on a portion thereof;
   electrical connections extending from said sensing element through said housing and said body; and a filler material disposed in said housing in contact with and surrounding said resistive temperature detection element of said temperature sensing element, said filler material consisting essentially of a blend of a first media and a second media of a different material from said first media, said first media comprising boron nitride and said second media having a chemical structure allowing said second media to bind with oxygen in said housing at low temperatures and to release oxygen in said housing at high temperatures that are higher than said low temperatures, said second media being configured to cooperate with and enhance chemical properties of said boron nitride and to improve stability and durability of said resistive temperature detection element.

5. The temperature sensor of claim 4 wherein said boron nitride is configured to be stable in reducing atmospheres up to 800° C. and in oxidizing atmospheres up to 850° C.

6. The temperature sensor of claim 4 wherein said second media is configured to entrain an amount of oxygen sufficient to avoid a reducing atmosphere in said housing.

7. The temperature sensor of claim 6 wherein said second media comprises a composite oxide.

8. The temperature sensor of claim 7 wherein said composite oxide comprises cerium and yttria-stabilized zirconia.

9. The temperature sensor of claim 7 wherein said composite oxide comprises cerium oxide.

10. The temperature sensor of claim 7 wherein said composite oxide comprises zirconium-oxide.

11. The temperature sensor of claim 8 wherein anomalies of a lattice structure of particles of said composite oxide allow said composite oxide to entrain and capture oxygen in said housing at low temperatures and expansion of said lattice structure at said high temperatures allows release of said entrained oxygen from said composite oxide in said housing.

12. The temperature sensor of claim 4 wherein said boron nitride is configured to provide a thermal pathway between said housing and said resistive temperature detection element of said temperature sensing element and is flexible to accommodate different rates of thermal expansion between said temperature sensing element and at least said electrical connections.

13. A system comprising:
an engine
an exhaust system configured to carry exhaust gases from said engine;
a sensor coupled to said exhaust system for detecting a temperature of said exhaust gases, said sensor comprising:
a body;
a housing coupled to one end of said body;
a temperature sensing element disposed within said housing, said temperature sensing element comprising a resistive temperature detection element disposed on a portion thereof;
electrical connections extending from said sensing element through said housing and said body; and
a filler material disposed in said housing in contact with and surrounding said resistive temperature detection element of said temperature sensing element, said filler material consisting essentially of a first media comprising boron nitride and being configured to provide a thermal pathway between said housing and said resistive temperature detection element of said temperature sensing element and being flexible to accommodate different rates of thermal expansion between said temperature sensing element and at least said electrical connections; and
a vehicle control system configured to control at least one operating parameter of the engine in response to an output of said sensor.

14. The system of claim 13 wherein said boron nitride is configured to be stable in reducing atmospheres up to 800° C. and in oxidizing atmospheres up to 850° C.

15. The system of claim 13 wherein said filler material further consists of a second media blended with said first media and of a different material from said first media, said second media having a chemical structure allowing said second media to bind with oxygen in said housing at low temperatures and to release oxygen in said housing at high temperatures that are higher than said low temperatures, said second media is configured to entrain an amount of oxygen sufficient to avoid a reducing atmosphere in said housing.

16. The system of claim 15 wherein said second media comprises a composite oxide.

17. The system of claim 15 wherein said second media is configured to provide oxygen storage capacity.

18. The system of claim 16 wherein said composite oxide comprises cerium and yttria-stabilized zirconia.

19. The system of claim 18 wherein anomalies of a lattice structure of particles of said composite oxide allow said composite oxide to entrain and capture oxygen in said housing at low temperatures and expansion of said lattice structure at said high temperatures allows release of said entrained oxygen from said composite oxide in said housing.

20. The system of claim 13 wherein said boron nitride has a hexagonal crystalline structure.

* * * * *